United States Patent [19]

Fender

[11] 4,210,125
[45] Jul. 1, 1980

[54] WATER FLOW CONTROLLER DEVICE

[75] Inventor: William H. Fender, San Diego, Calif.

[73] Assignee: Solardyne, Inc., San Diego, Calif.

[21] Appl. No.: 933,514

[22] Filed: Aug. 14, 1978

[51] Int. Cl.² ............................................. F24J 3/02
[52] U.S. Cl. .................................... 126/437; 126/422
[58] Field of Search ............... 126/270, 271, 362, 400; 237/1 A; 62/238; 122/17, 18, 412, 441

[56] References Cited
U.S. PATENT DOCUMENTS

| | | | |
|---|---|---|---|
| 4,073,285 | 2/1978 | Wendel | 126/271 |
| 4,119,087 | 10/1978 | Cook | 126/271 |
| 4,126,122 | 11/1978 | Bross | 237/1 A |

Primary Examiner—James C. Yeung
Attorney, Agent, or Firm—John L. Haller

[57] ABSTRACT

An apparatus for directing and controlling the flow of water between the supply and return of a solar collecting device, the cold water inlet and hot water outlet of a water heater and the cold water source and hot water feed of conventional household plumbing. The Water Flow Controller Device includes a cold water source connector, a hot water feed connector, a collector supply connector, a collector return connector, a cold water inlet connector, and a hot water outlet connector. The hot water outlet connector is bifurcated to provide independent water flows paths for the hot water and the collector return water. The Water Flow Controller Device circulates water through a connected solar collecting device when the temperature at the output of the solar collecting device is above the temperature of the water at the bottom of a connected water heater. Further, the Water Flow Controller Device provides circulation through the solar collecting device for the water heater whereby to heat the water therein such that a demand for hot water from the household plumbing can be satisfied from the water heater in a conventional manner.

9 Claims, 5 Drawing Figures

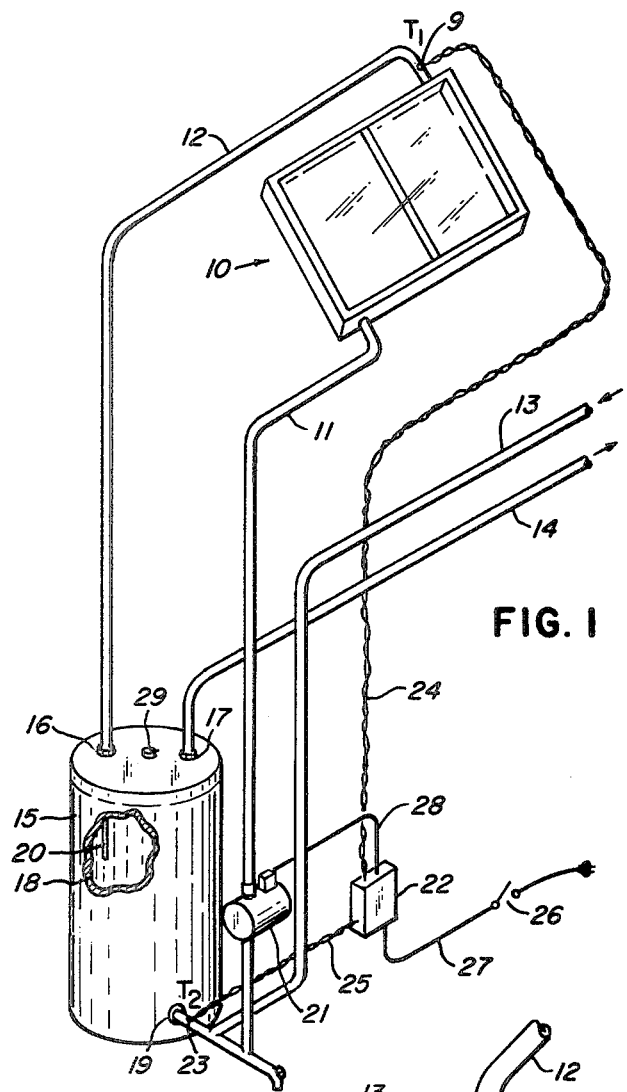
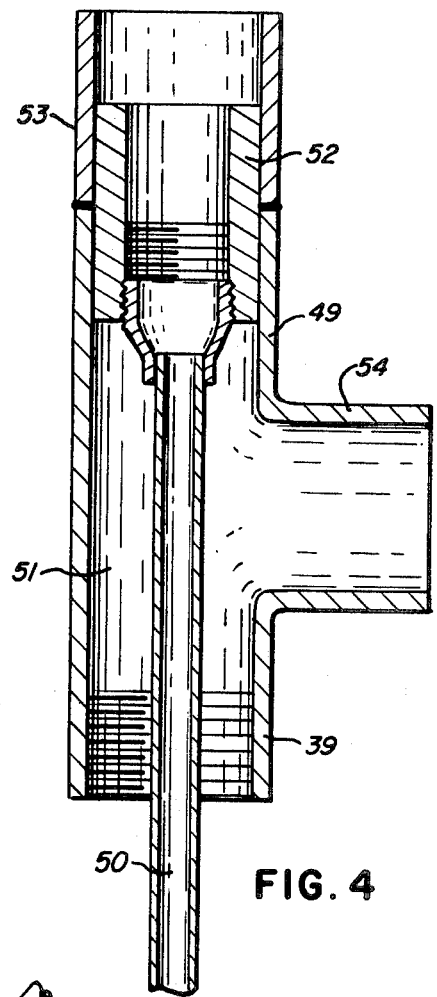
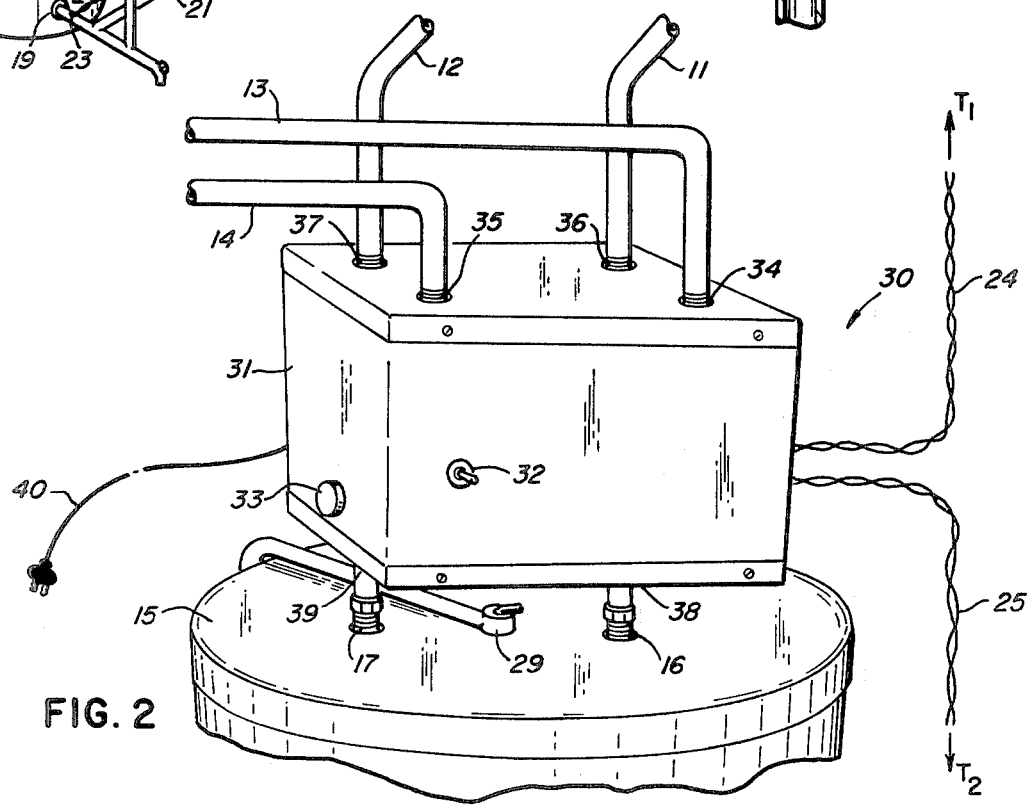
FIG. 1
FIG. 4
FIG. 2

WATER FLOW CONTROLLER DEVICE

BACKGROUND OF THE INVENTION

1. Field of the Invention

This invention relates to an apparatus for directing and controlling the flow of water, or other heatable fluid, from, to and between a solar collecting device, a fluid reservoir, namely a water heater, and a fluid source and a heated fluid feed, namely the conventional plumbing of a household or other facility.

The continuing interest in energy conservation has resulted in an enormous growth in the area of solar collecting devices. Generally, the household application of these solar collecting devices calls for their installation into conventional household plumbing using the existing water heaters as a convenient reservoir for its solar heated water.

Substantial activity has been experienced in the development of new and improved solar collecting devices, however, little, if any, developmental activity has been devoted to the improvement of ancillary equipment such as this Water Flow Controller Device.

2. Description of the Prior Art

Substantial economic savings can be enjoyed by installing a solar collecting device into existing household plumbing and its existing water heater. However, such procedures have generally resulted in the improper use and operation of the water heater.

Specific procedures which have been and are being used require connections to the water heater through the Pressure/Temperature Relief Valve or through the water heater tank drain. Some installation procedures require physical modification of the water heater to provide additional access ports to the water heater tank through which the solar collecting device is connected.

Prior to my invention no satisfactory self-contained apparatus has been developed to facilitate the installation of a solar collecting device which does not require an inappropriate connection to the existing water heater.

SUMMARY OF THE INVENTION

This invention relates to an apparatus which readily connects to the hot water outlet and the cold water inlet of a water heater and, therefore, does not require the inappropriate or improper use of the water heater as generally done in the prior art. The apparatus of this invention provides, within a single enclosure, connections to the cold water inlet and hot water outlet of a water heater, connections to the collector supply and collector return of a solar collecting device and connections to the hot water feed and cold water source of the facility or household plumbing.

The Water Flow Controller Device detects the temperature of the water at the output of the solar collecting device and at the lower portion of the water heater and if the temperature at the output of the solar collecting device is above that at the lower portion of the water heater, it will cause water to circulate through the solar collecting device. The water heater is used as a fixed reservoir for the solar collecting device, which after a number of full circulations of water therethrough results in a reservoir of water having a substantially increased temperature. Additional installed water storage devices may be used in conjunction with the water heater. The water within this reservoir (the water heater or storage device) is available to users of the facility plumbing system on demand and the used hot water is replenishing through the conventional cold water source of the water heater.

Accordingly, it is an object of this invention to provide a Water Flow Controller Device which is self-contained and is easily installed and connected to the facility plumbing, the solar collecting device, and the water heater. A further object of this apparatus is to provide a device which mointors and detects the temperature of water within a connected solar collecting device and water heater and will automatically circulate water through a solar collecting device if the solar collecting device can contribute heat to the water within the water heater. It is a further object of his invention to provide an apparatus which is easy to install and replace and also permits the easy installation replacement of the associated water heater or storage device.

A further object of this invention is to provide a Water Flow Controller Device which is connected to a water heater in such a way that improper or inappropriate use of the water heater is not required.

BRIEF DESCRIPTION OF THE DRAWINGS

The following is a brief description of the accompanying drawings.

FIG. 1 is a schematic representation of the prior art retrofit installation of a solar collecting device.

FIG. 2 is a view of the Water Flow Controller Device mounted to a water heater.

FIG. 4 is a sectional view of the bifurcated hot water outlet-return coupling.

DESCRIPTION OF THE PREFERRED EMBODIMENT

Figure 3:
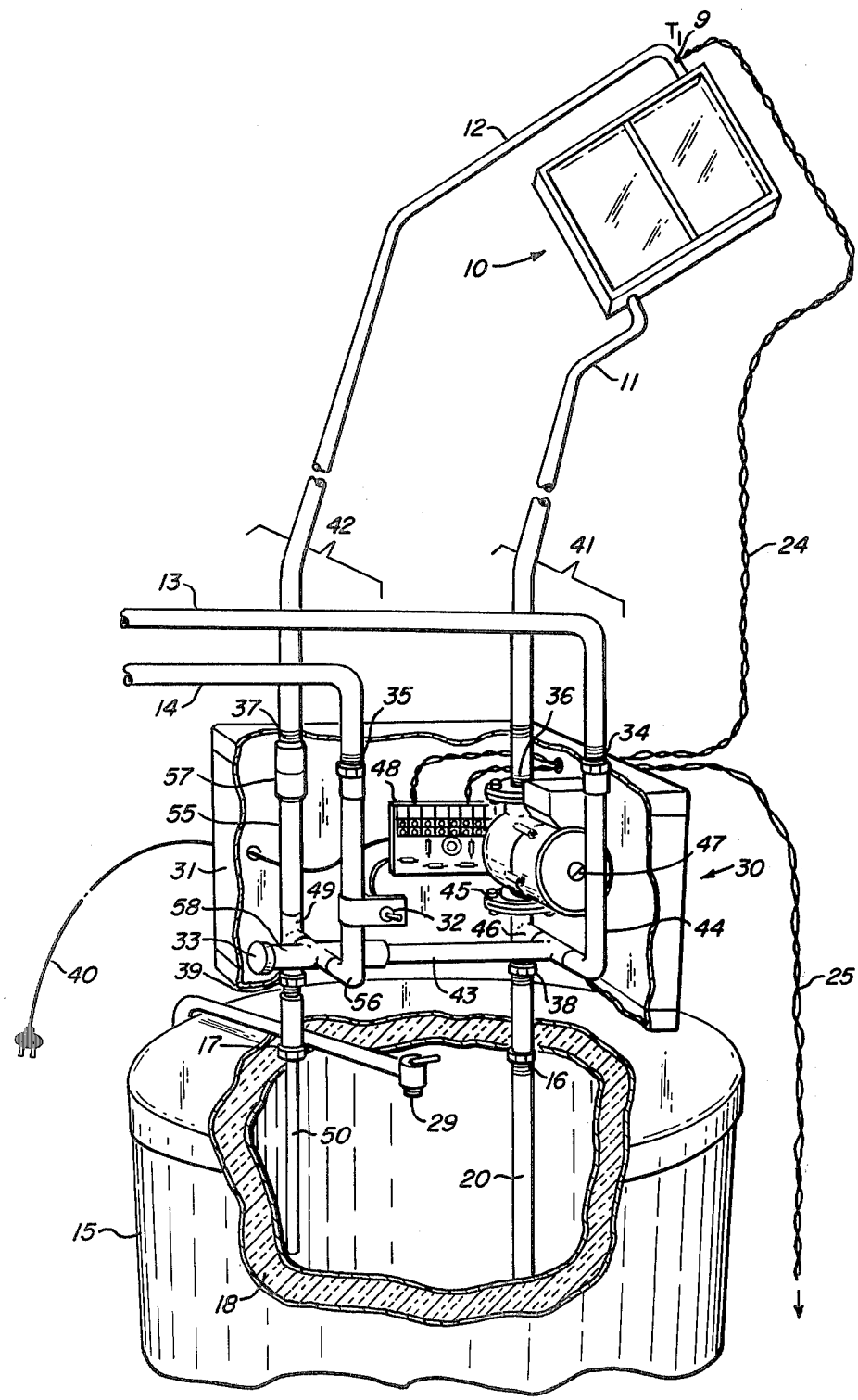
FIG. 3 is a broken view of the Water Flow Controller Device showing the internal structure thereof.

FIG. 1 is a schematic representation of a prior art retrofit installation of a solar collecting device, wherein the solar collecting device is connected to the water heater and household plumbing. A solar collecting device is shown generally at 10 with collector supply line 11 and collector return line 12. The household plumbing includes a cold water source line 13 and a hot water feed line 14. The water heater 15 includes a cold water inlet 16, a hot water outlet 17, a tank reservoir 17, and a tank drain 19. In a conventional water heater 15, the cold water inlet 16 is coupled to a dip tube 20 through which the cold water is deposited directly into the lower portion of the tank reservoir 18. This structure is used to prevent the inadvertent mixture of cold water and hot water within the water heater 15, and therefore allow the hot water to rise to the top of the tank where it can be drawn off on demand.

In a prior art installation, as represented in FIG. 1, the collector return line 12, of the solar collecting device 10 is connected to the cold water inlet 16 of the water heater 15. Further, because the collector return line 12 generally provides warm to hot water, the dip tube 20 is modified by shortening it to a point where it dispenses the solar return water within the tank reservoir 18 of water heater 15 at a depth of approximately one-third (⅓) the distance from the top of the water heater 15.

The hot water feed line 14, which supplies water to the household plumbing is conventionally connected to the hot water outlet 17 of the water heater 15.

The cold water supply line 13 must dispense its source of water into the lower portion of the tank reservoir 18. To accomplish this, without access to the cold water inlet 16, the cold water supply line 13 is inappropriately connected to the tank drain 19. Further, the collector supply line 11, which feeds the cold to warm water from the bottom of the tank reservoir 18 to the solar collecting device 10, is inappropriately connected through fittings, to the tank drain 19.

In this configuration circulation control of the water through the water heater 15, the solar collecting device 10, and the household plumbing, is accomplished. However, the physical connections made to the water heater 15 are made in a way that is unconventional and inappropriate.

Circulation of water through the solar collecting device 10, is effected by an in-line circulating pump 21. The circulating pump 21 is electrically controlled by a differential thermostat controller 22 which activates the pump when there is an appropriate temperature difference between the water at the collector outlet 9 of the solar collecting device 10 and the water in the lower portion 23 of the tank reservoir 18. The temperature of the water at the collector output 9 and at the lower portion 23 of the tank reservoir 18 is determined by thermistors T-1 and T-2, respectively, which transmit an electrical signal, proportional to the detected temperature, over collector thermostat line 24 and tank thermostat line 25, respectively. The differential controller 22, which is powered by conventional household current through on/off switch 26 and power line 27, activates the circulating pump 21 through pump control line 28.

The present method of installing a solar collecting device 10 to the household plumbing and an existing water heater 15 is complicated, requires modification to the water heater 15, and inappropriately uses the features and structures of the water heater 15. While other specific techniques of installing a solar collecting device 10 have been and are being used; such as, the inappropriate use of the temperature and pressure valve 29 or modifying the tank reservoir 18 of the water heater 15 by putting one or two additional holes into the tank reservoir 18, they represent equally undesirable alternatives.

FIG. 2 shows the Water Controller Device generally at 30, mounted to the cold water inlet 16 and the hot water outlet 17 of the water heater 15. The Water Flow Controller Device 30 is mounted a sufficient distance above the top of the water heater 15 to clear the temperature and pressure valve 29. The external features of the Water Flow Controller Device 10 include a generally rectangular enclosure 31 with a controller enabling switch 32 and temperature control valve handle 33. The Water Flow Controller Device 30 is provided with externally accessible connections for the facility or household plumbing, including a cold water source connector 34 and a hot water feed connector 35; for a solar collecting device, including collector supply connector 36 and a collector return connector 37; and for the water heater 15, including a cold water inlet connector 38 and a hot water outlet connector 39.

Installation of the Water Flow Controller Device 10 is easily facilitated by connections of the cold water inlet 16 and the hot water outlet 17 of the water heater 15 to the cold water inlet connector 38 and hot water outlet connector 39 of the Water Flow Controller Device 30, respectively, generally using sufficient standoff unions to clear the temperature and pressure valve 29. An eccentric coupling or union may be used to accommodate slight variations in the distance between the cold water inlet 16 and the hot water outlet 17 of different water heaters 15. The cold water source connector 34 and the hot water feed connector 35 are connected to the cold water source line 13 and the hot water feed line 14 of the facility or household plumbing, respectively. The collector supply connector 36 and the collector return connector 37 are connected to the collector supply line 11 and the collector return line 12 of a solar collecting device, respectively. The collector output thermistors T-1 and the tank thermistors T-2 are connected to receiving terminals (not shown) on the Water Flow Controller Device 30 through collector thermostat line 24 and tank thermostat line 25, respectively. Power is provided to the Water Flow Controller Device 30 by a controller power line 40. The Water Flow Controller Device 30 is activated by turning the enabling switch 32 to automatic or manual. The output water temperature is controlled by adjusting the temperature control valve handle 33 to provide the desired output water temperature.

As seen from FIG. 2, the installation of the Water Flow Controller Device 30 is accomplished with minimal effort and with a substnatial reduction of required external plumbing. Further, the Water Flow Controller Device 30 is installed without the necessity of modifying the existing water heater 15 and without using the structure or features of the water heater in an unconventional or inappropriate manner.

FIG. 3 is a diagram of the Water Flow Controller Device 30 with a portion of its enclosure 31 broken away to show its internal structure. The internal structure of the Water Flow Control Device 10 generally includes a cold water side 41 and a hot water side 42 which are inner-connected only through a tempering line 43.

The cold water side 41 includes the cold water source connector 34, the cold water inlet connector 38 and the collector supply connector 36. To insure proper operation of the water heater 15, an uninterrupted cold water line 44 internally couples the cold water source connector 34 to the cold water inlet connector 38. Therefore, any drain of hot water from the water heater 15 will automatically be replenished through the uninterrupted cold water line 44 from the facility or household plumbing cold water source line 13, through the cold water source connector 34, the cold water line 44, the cold water inlet connector 38, and finally through the cold water inlet 16 into the water heater 15. Generally, the cold water inlet 16 of the water heater 15, is connected to a dip tube 20, which causes the cold water being transported therethrough to be deposited at the lower portion of the tank reservoir 18 of the water heater 15.

Connection to the collector supply line 11 of a solar collecting device 10 is provided through collector supply connector 36 which is internally coupled to the cold water line 44 by collector source line 45, in any conventional manner such as the connector T-fitting 46. Because the solar collecting device 10 and the water heater 15 representing a close system, water will not generally flow through the solar collecting device 10.

In order to force water through the solar collecting device 10, mechanical assistance is provided by an in-line circulating mechanical collector pump 47 which, essentially, pushes water through the solar collecting device 10. The collector pump 47 is installed within collector source line 45.

One pump which satisfactorily meets the requirements of providing a 14 foot head or a rate of up to about 23 gallons per minute is for example, the Model UP25-42SF in-line pump made by Grundfos of Clovis, Calif.

Control of the collector pump 47, is effected through an electronic controller 48 mounted to the inside of the enclosure 31 of the Water Flow Controller Device 30. The electronic controller 48 operates on conventional household current supplied through controller power line 40 and has a controller enable switch 32 which turns the collector pump 47 and the electronic controller 48 off, turns electronic controller 48 and the controller pump 47 on, or turns the electronic controller 48 on and enables automatic operation of the collector pump 47. The electronic controller 48 receives a first electrical signal from the collector thermistor T-1 located at the collector output 9 of the solar collecting device 10 over collector thermostat line 24, which is proportional to the temperature of the water at the collector output 9, and a second electrical signal from the tank thermistor T-2 located at the lower portion of the tank reservoir 18 over tank thermostat line 25 which is proportional to the temperature of the water at the bottom of the tank reservoir 18. If the Water Flow Controller Device 30 is enabled for automatic operation the electronic controller 48 will automatically turn the controller pump 47 ON if it detects a solar collector output water temperature which is higher (approximately 3° F.) than the water temperature at the lower portion 23 of the tank reservoir 18.

An electronic controller device which satisfactorily meets these requirements is, for example, the Model 8H-1510-B Veriflow Control Board made by Hawthorne Industries, Inc., of West Palm Beach, Florida. Alternative methods to control the controller pump 47 include a time clock type control used to turn the collector pump on and off at a preselected time each day. Also an electronic photo cell could be used to turn on and off the collector pump 47 if the amount of light exceeds certain predetermined limits. Another possibility is to provide a simple manual switch which can be used to turn the collector pump 47 on and off when desired.

The operation of the electronic controller 48 and the collector pump 47 causes the circulation of water through the solar collecting device 10 if the temperature of the water at the collector output 9 of the solar collecting device 10 is above the temperature of the water at the lower portion of the tank reservoir of the water heater 15.

The hot water side 42 includes the hot water feed connector 35, the hot water outlet connector 39, and the collector return connector 37. Significantly, the hot water outlet connector 39 is a bifurcated coupling allowing for two independent water flow paths through the single hot water outlet 17 of the water heater 15.

FIG. 4 is a sectional diagram of the bifurcated hot water outlet-return coupling 49 having the hot water outlet connector 39. As shown in FIG. 4, the hot water outlet connector 39 of the bifurcated coupling 49 has an inner channel 50 and an independent outer annular channel 51. The inner channel 50 is connected to a reducing fitting 52 which is secured by braze welding into the opposite straight path side 53 of the generally T-shaped bifurcated coupling 49. The outer annular chamber 51, separately and independently communicates with the opposed side 54 of the T-shaped bifurcated coupling 49. Through the application and use of the structure of this special bifurcated coupling 49, two independent water flow paths are provided.

Returning to FIG. 3, the inner channel 50 separately and independently connects through the opposite straight path side (not shown) of the bifurcated coupling 49 to the collector return connector 37 through collector line 55. The outer annular channel (not shown) separately and independently connects to the opposite side (not shown) of the bifurcated coupling 49, then to the hot water feed connector 35 through the hot water line 56. The inner channel 50, carrying the return water from the solar collecting device 10, is extended such that, during installation of the Water Flow Controller Device 30, the inner channel 50 is inserted into the hot water outlet 17 of the water heater 15 so that it will generally dispense the return water at a depth of about one-third ($\frac{1}{3}$) the distance down into the tank reservoir 18 of the water heater 15.

The outer annular channel (not shown) communicates with the top of the thank reservoir 18 of the water heater 15 such that any demand for hot water is supplied directly from the top of the tank reservoir 18 where the hottest water naturally gravitates.

To prevent any back pressure or water flow through the solar collecting device 10, an in-line check valve 57 is installed in the collector line 55. A check valve which satisfactorily meets the requirements of the Water Flow Controller Device 30 is, for example, the Model 300-$\frac{3}{4}$ inch, all bronze, noiseless check valve made by Strataflo Products, Inc., of Fort Wayne, Indiana.

Generally, a solar collecting device 10 is allowed to heat the water within the tank reservoir 18 to as high a temperature as it is capable of achieving in order to retain as much heat as possible whereby this accumulated heat can be used over periods when it cannot be replenished (at night). Because the temperature achievable by the solar collecting device 10, is well above that generally used for household purposes, some cold water is often combined with the hot water to provide a usable supply of household hot water. This mixing of hot water and cold water is accomplished by a tempering valve 58 which is installed in the hot water line 56 and is also connected to the cold water line 44 by tempering line 43. The temperature of the hot water output of the tempering valve 58 can be adjusted through tempering control valve handle 33 to a predetermined value. The tempering valve 58 automatically mixes the appropriate quantity of cold water to the hot water supplied from the top of the tank reservoir 18 to produce the preselected water temperature. A tempering valve which satisfactorily meets the requirements of the Water Flow Controller Device 30 is, for example, the Model 70A-$\frac{3}{4}$ inch, Sweat, Tempering Valve made by Watts Regulator Company of Laurence, Massachusetts.

Figure 5:
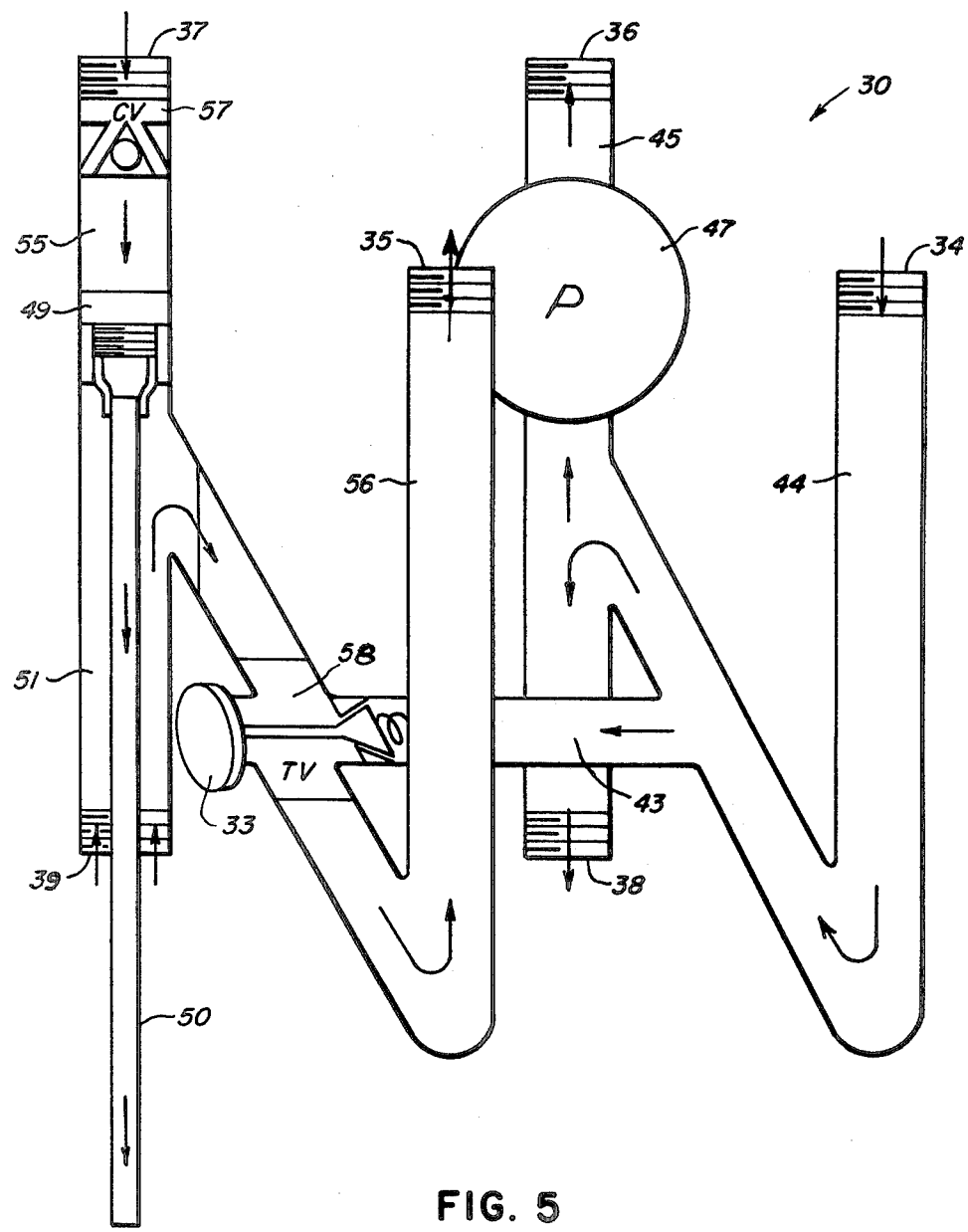
FIG. 5 is a flow diagram of the Water Flow Controller Device.

FIG. 5 is a schematic representation of the Water Flow Controller Device 30 showing the direction of water flow therein. The Water Flow Controller Device 30 has the unobstructed flow of cold water from the cold water source connector 34 through the cold water line 44 to the cold water inlet connector 38. Also the supply of water to the collector supply connector 36 is provided through collector source line 45 with the in-line collector pump 47.

FIG. 5 also shows the bifurcated coupling 49 having the inner channel 50 and outer annular channel 51. The extended inner channel 50 provides the means for depositing the collector return water from the collector return connector 37 through the check valve 57, the collector line 55, the inner channel 50 of the bifurcated coupling 49 and into the center portion of the tank reservoir (not shown). Hot water is drawn from the top of the tank reservoir (not shown) through the outer annular chamber 51, at the hot water connector 39, of the bifurcated coupling 49 and through tempering valve 58 in the hot water line 56 to the hot water feed connector 35. The tempering valve 58 is also connected to the cold water line 44 through the tempering line 43.

The description of the Water Flow Controller Device 30 shows only one embodiment of my invention, and other specific structural configurations could equally satisfy the requirements and meet the objectives of the Water Flow Controller Device 30. For example, repositioning the collector pump 47 to the collector return line 55 would be completely satisfactory for some applications. Further, moving the check valve 57 to the collector source line or eliminating it all together is possible. Also, depending upon the application and use of the Water Flow Controller Device 30, the tempering valve 58 and the tempering line 43 can be eliminated. In some applications where the solar collecting device is below the level of the Water Flow Controller Device and the water heater, the collector pump 47 may be eliminated and the circulation of water provided by thermal-siphoning.

Additional structural alternatives for the Water Flow Controller Device 30 is to provide for the addition of supplemental equipment such as, the installation of a freeze relief valve (not shown) used to drain the solar collecting device of water to protect it against rupture due to freezing temperatures or to turn the collector pump 47 on to circulate warm water through the solar collecting device 10 and thus prevent its freezing.

Other applications for the Water Flow Controller Device include its use relative to any heatable fluid such as oil for high temperature applications or air for space heating applications. Also the device could be used to cool the heatable fluid if operated at night using inverse temperature settings for the electronic controller.

The description of my invention, the Water Flow Controller Device is done to fully comply with requirements of 35 U.S.C. 112 and is not intended to limit my invention in any way. It is seen from the above description that various forms of the Water Flow Controller Device could easily be developed within the skill of the art. Therefore, such varying forms are considered to be within the scope and essence of my invention.

What is claimed is:

1. A Water Flow Controller Device of the type used for connecting a solar collecting device to conventional facility plumbing and a water reservoir, which comprises:
   (a) a cold water source connector;
   (b) a hot water feed connector;
   (c) a collector supply connector;
   (d) a collector return connector;
   (e) a cold water inlet connector;
   (f) a bifurcated hot water outlet connector having a collector return channel and a hot water feed channel;
   (g) cold water line means connecting said cold water source connector to said cold water inlet connector;
   (h) collector supply line means connecting said collector supply connector to said cold water lines means;
   (i) hot water line means connecting said hot water feed channel of said bifurcated hot water outlet connector to said hot water feed connector;
   (j) collector line means connecting said collector return channel of said bifurcated hot water outlet connector to said collector return connector;
   (k) means for circulating water connected within said collector supply line means;
   (l) means for controlling said circulating means electrically connected to said circulating means; and
   (m) whereby said cold water source connector may be connected to a cold water source line of said facility plumbing; said hot water feed connector may be connected to a hot water feed line of said facility plumbing; said collector supply connector may be connected to a supply of said solar collecting devise; said collector return connector may be connected to a return line from said solar collecting device; said cold water inlet connector may be connected to a cold water inlet of said water reservoir; and said bifurcated hot water connector may be connected to a hot water outlet of said water reservoir.

2. A water flow controller device, as recited in claim 1, wherein said controller means includes a detecting controller, a first means for detecting the water temperature at the output of the solar collecting device electrically connected to said detecting controller, and a second means for detecting the temperature of the water within said water reservoir electrically connected to said detector controller; and said detecting controller electrically connected to said circulating means to enable said circulating means when the water temperature detected by the first means is above the water temperature detected by the second means.

3. A Water Flow Controller Device, as recited in claim 1, further comprising tempering line means for connecting the cold water line means to the hot water line means and means for adjustably controlling the mixture of cold water and hot water therethrough.

4. A Water Flow Controller Device for connecting cold water source line and a hot water feed line of facility plumbing and a collector supply line and a collector return line of a solar collecting device to a cold water inlet and a hot water outlet of a water reservoir whereby to circulate water through the solar collecting device and provide hot water to the facility plumbing, which comprises: a cold water line connecting the cold water source line to the cold water inlet; a collector source line connecting the collector supply line to the cold water line; a bifurcated coupling connected to the hot water outlet and having and independent collector line connected to the collector return line, and an independent hot water line connected to the hot water feed line; circulating means connected to the collector source line for circulating water therethrough; and control means connected to the circulating means for controlling the circulating means.

5. A Water Flow Controller Device, as recited in claim 4, further comprising an adjustable mixing valve connecting the hot water line to the cold water line whereby said valve adjustably adds cold water to hot water to provide a hot water output at a preselected temperature.

6. A Water Flow Controller Device, as recited in claim 4, wherein said controlling means includes means for detecting the temperature of the water at the output of the solar collecting device and means for detecting the temperature of the water within the water reservoir, and means for enabling the circulating means, each of said detecting means being connected to said enabling means, said enabling means turning on said circulating means when the temperature of the water detected at the output of the solar collecting device is above the temperature of the water detected within the water reservoir.

7. A Water Flow Controller Device, as recited in claim 4, wherein said circulating means is an in-line electrical pump.

8. A Water Flow Controller Device, as recited in claim 4, wherein said water reservoir is a conventional water heater.

9. A Water Flow Controller Device, as recited in claim 4, further comprising check valve means connected within the collector line, for allowing water to flow only towards the hot water outlet.

* * * * *